INTEGRATED MICROWAVE CIRCULATOR AND FILTER

Filed Nov. 24, 1967

INVENTORS L. F. MOOSE
M. OMORI
BY
ATTORNEY

United States Patent Office 3,448,409

Patented June 3, 1969

3,448,409

INTEGRATED MICROWAVE CIRCULATOR AND FILTER

Louis F. Moose, Quakertown, and Masahiro Omori, Allentown, Pa., assignors to Bell Telephone Laboratories, Incorporated, Murray Hill, N.J., a corporation of New York Filed Nov. 24, 1967, Ser. No. 685,350

Int. Cl. H01p *1/32*

U.S. Cl. 333—1.1 5 Claims

ABSTRACT OF THE DISCLOSURE

An integeated microwave strip assembly including a filter and a circulator in which a single slab of ferrite comprises jointly the substrate of a circulator pattern and the substrate of a reactive pattern. The entire slab is magnetically biased so that the part comprising the substrate of the circulator produces the desired nonreciprocal coupling and the part comprising the substrate of the reactive pattern tunes the reactances to resonance at a frequency dependent on the magnetic bias.

*Background of the invention*

This invention relates to integrated microwave assemblies and more particularly to integrated combinations of multiport, nonreciprocal circulators and tunable microwave filters.

Extensive effort is currently being made in the art to combine, make smaller and reduce the cost of microwave components by utilizing TEM mode or modes similar thereto with microwave strip transmission lines and printed circuit techniques. In the course of this development sections of transmission line have been combined in integrated assemblies or modules with coupling networks, such as hybrids and directional couplers, with resistive and reactive elements and sometimes with active components such as varactors and transistors. A recent survey of circuits of this type may be found in Electronics, vol. 40, page 107, Oct. 30, 1967, in an article entitled, "Microwave IC's Come of Age."

In addition to combinations already proposed, there is a need for a circulator in combination with a tunable filter to be used in channel dropping operations or to be used to drive nonlinear devices in mixers or parametric amplifiers, to mention only two typical applications.

*Summary of the invention*

In accordance with the present invention a single thin slab of high dielectric gyromagnetic material, such as ferrite or a rare earth substituted yttrium iron garnet, is used jointly as the substrate of a conductive pattern forming the strip transmission line junction required for the circulator and also as the substrate of an interrupted conductive path forming tuned reactance elements making up a filter. The entire slab is magnetically biased so that the gyromagnetic properties of the part thereof associated with the circulator portion produces the desired nonreciprocal coupling and simultaneously so that the variable permeability properties of the part thereof associated with the filter portion produce resonance at variable frequencies. The structure may be designed so that varying the biasing field varies the tuning of the filter within a broadband range of operation of the circulator. Alternately varying the field may be used to tune both a narrow band circulator and the filter, or provision may be made in accordance with one feature of the invention to separately tune the circulator and the filter by adjusting separately the local strength of the biasing magnetic field effecting each part. Thus one aspect of the invention resides in an electrically tunable filter using strip transmission lines.

*Detailed description*

Figure 1:
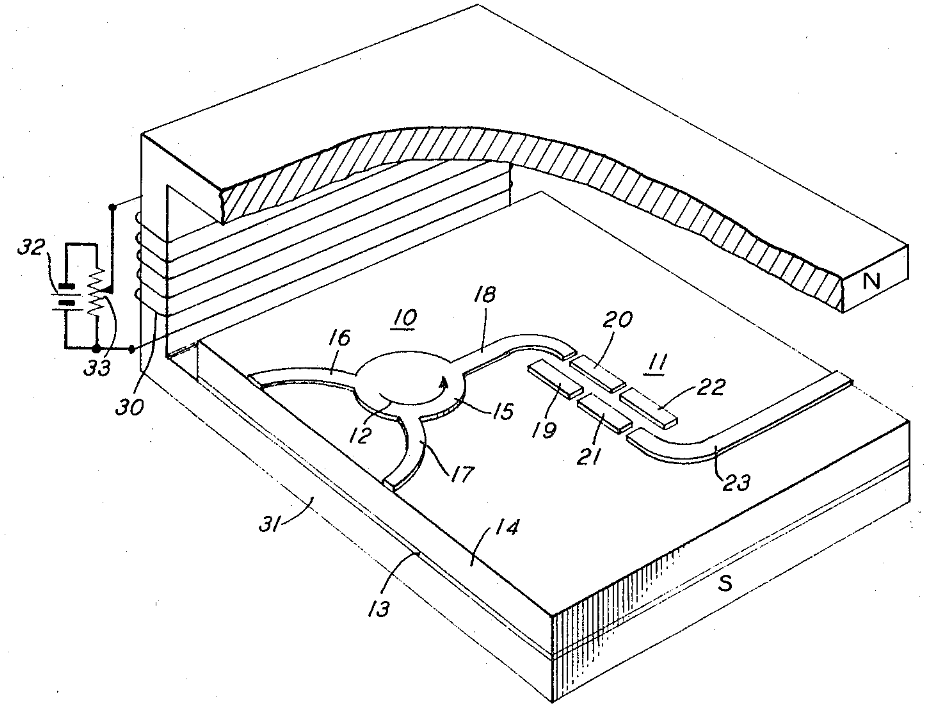
FIG. 1 is a cut away perspective view of an assembly in accordance with the invention.

Referring more particularly to FIG. 1, an illustrative embodiment of an integrated circulator 10 and filter 11 are shown using the nonsymmetrical type of TEM transmission line, sometimes referred to as the Microstrip in which a thin conductive pattern extends parallel to and is spaced from a single large area conductive surface or ground plane by a high dielectric constant separator. For convenience the entire conductive pattern will be designated 15–23 and different portions of it will subsequently be allocated to different functions. It should be understood however that the invention may be applied to lines of the symmetrical type, sometimes referred to as strip lines, in which the thin center conductor is interposed between a pair of conductive ground planes. Regardless of form, the separator in accordance with the present invention is formed by a thin flat slab 14 of high dielectric constant ferromagnetic or ferrimagnetic material of the type which presents gyromagnetic effects to electromagnetic waves. For example, ferrites and the rare earth substituted yttrium iron garnet materials are well known for use in such devices. Slab 14 is thus interposed between conductive strip pattern 15–23 and ground plane 13. In accordance with the preferred form of the invention, either or both conductive members may be formed upon slab 14, using it as substrate, by means of printed circuit techniques or by plating thereon conductive layers which are suitably etched away to leave the desired configuration.

The conductive pattern 15–23 includes the spider member of circulator 10 comprising common portion 15 and three strips 16, 17 and 18 symmetrically extending away from the common portion. Some of these strips such as 16 and 17 may extend to the edge of the assembly and constitute input and/or outputs of circulator 10 to which other strip lines, coaxial components, waveguides or loads may be connected by way of transitional members conventional in the art. Other strips, such as strip 18, after an arbitrary bend or bends dependent upon the desired layout, connect to filters such as 11, which in the form illustrated comprise a plurality of disjointed or spaced conductive strips 19, 20, 21 and 22 each of a length to be described hereinafter successively extending from strip 18 to another output strip 23. Successive strips coextend adjacently by almost one half their lengths so that successive sections are coupled by a factor dependent upon their spacing. Specific designs and alternative strip configurations are well known in the art to produce fixed filters having both bandpass and band rejection characteristics.

Gyromagnetic element 14 is then magnetically biased in a direction normal to the plane of conductive strip pattern 15–23 by an external field applied for example by a solenoid 30 having a U-shaped core 31 of low permeability material so as to provide pole pieces N and S above and below slab 14. For operation in the Microstrip mode it is preferred that one pole piece, such as S, be adjacent to the ground plane 13 and that the other pole piece, such as N, be spaced above the conductive strip pattern 15–23 by at least five times the spacing between the strip pattern and ground plane 13. Current for solenoid 30 is derived from source 32 and its strength is adjusted by rheostat 33 to produce a magnetization in slab 14 of strength known to produce circulator action, that is, a sequential transfer of microwave power among the strips 16, 17 and 18 as illustrated by the curved arrow 12. A complete description of circulator action and the values of parameters required to obtain this action are described for example in textbooks such as Microwave Ferrites and Ferrimagnetics, by Lax & Button, 1962, pages 517 and 609; or in publications such as Fay and Comstock, "Operation of the Ferrite Junction Circulator; 13 IEEE Transactions MTT, pages 15–27, January 1965.

The material of the part of slab 14 associated with strip portions 19, 20, 21 and 22 is also magnetically biased by solenoid 31 and this bias determines the effective permeability to electromagnetic wave energy supported by each portion. This permeability in turn determines the effective distributed inductance of each strip portion. In accordance with the invention, each of strip portions 19, 20, 21 and 22 have electrical lengths at the desired bandpass frequency and with a given degree of bias of one-half wavelength. This means that the distributed capacity and distributed effective inductance are resonant at the bandpass frequency.

The invention contemplates several modes of operation. According to a first, circular 10 is designed to have a broadband characteristic so that its specific frequency of operation is relatively independent of the exact bias of gyromagnetic element 14. Therefore changing the setting of rheostat 33 changes the resonant frequency of strips 19 through 22 and the bandpass frequently resulting therefrom. Frequency components applied to strip 17 within the passband appear on strip 23 while components outside of the passband are transferred by circulator 15 to strip 16. Since the frequency of operation of circulator 15 and the bandpass frequency of filter 11 both vary in the same direction with changes in the magnetic bias of gyromagnetic slab 14, both may be tuned within a range by varying rheostat 33.

Figure 2:
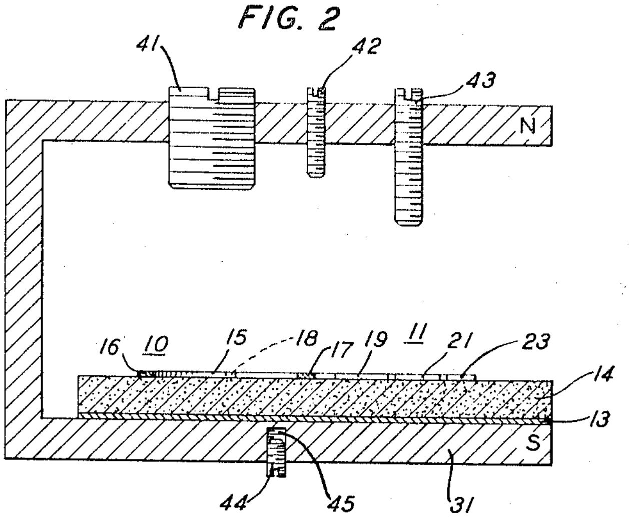
FIG. 2 is a cross-sectional view showing a modification of the structure of FIG. 1 in accordance with the invention.

FIG. 2 shows by means of a cross-sectional view, a modification of FIG. 1 in accordance with the invention in which corresponding reference numerals have been used to designate corresponding components. Modification will be seen to reside in means for locally modifying and separately controlling the magnetic field affecting circulator 10 and the several sections of filter 11. In particular the N pole of solenoid 31, which may now be permanently magnetized if desired, is provided with a plurality of adjustable high permeability probes such as steel screws 41, 42, and 43 in the portion thereof above conductive pattern 15–23. Screw 41, located over common portion 15 of circulator 10 may be larger in diameter than screws 42 and 43 located respectively over specific sections of filter 11. Increasing the penetration of a given screw tends to increase the magnetic bias in slab 14 in a generalized region thereof below that screw. Despite an unavoidable interaction between regions it is possible to separately tune circulator 10 and to separately tune each of the sections of filter 11 either to the same frequency or in a stagger tuned fashion. A smaller degree of field variation but of a more localized nature can be obtained by locating screws such as 44 in that pole of solenoid 31 adjacent to slab 14 in a hole such as 45 drilled through it part of the way only from the bottom. Withdrawing screw 44 increases the field strength in the area just above if the body in which the screw is located is itself premanently magnetized and decreases the field strength if the magnetization is supplied elsewhere as by a solenoid.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An integrated microwave assembly comprising a ground plane conductor, a branched strip conductor defining with said ground plane in one region a junction circulator and in another region a plurality of coupled resonant elements, a member of gyromagnetic material located between said ground plane conductor and said branched strip conductor and extending in both said regions, means for magentically biasing said member in both said regions to produce circulating action for electromagnetic waves in a given frequency band in said one region and to produce resonance of said elements in said band in said other region.

2. The assembly according to claim 1 wherein said means for biasing includes a common magnetic pole piece extending over both said regions.

3. The assembly according to claim 2 including at least one magnetically permeable protrusion on said pole piece for locally modifying the strength of said mangentic bias in the region of said protrusion.

4. The assembly according to claim 2 including at least one magnetically permeable screw received in said pole piece for locally modifying the strength of said magnetic bias in the region of said screw.

5. A microwave strip assembly comprising a ground plane conductor, a plurality of sections of strip conductor defining with said ground plane a plurality of coupled resonant elements, a member of high dielectric constant ferromagnetic material located between said ground plane conductor and said strip conductor sections, means for magnetically biasing said member including a common magnetic pole piece extending over said sections to produce resonance of said elements in a given frequency band, and at least one magnetically permeable protrusion on said pole piece for locally modifying the strength of said magnetic bias in the region of said protrusion.

References Cited

UNITED STATES PATENTS

| | | | |
|---|---|---|---|
| 2,984,802 | 5/1961 | Dyer et al. | |
| 3,339,158 | 8/1967 | Passaro | 333—1.1 |

HERMAN KARL SAALBACH, *Primary Examiner.*

P. L. GENSLER, *Assistant Examiner.*

U.S. Cl. X.R.

333—73, 84; 335—212